United States Patent
Park et al.

(10) Patent No.: US 9,873,973 B2
(45) Date of Patent: Jan. 23, 2018

(54) WASHING MACHINE

(71) Applicant: Samsung Electronics Co., Ltd, Gyeonggi-do (KR)

(72) Inventors: Wan Gi Park, Gyeonggi-do (KR); Kab Jin Jun, Gyeonggi-do (KR); Ji Hoon Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/373,433

(22) Filed: Dec. 8, 2016

(65) Prior Publication Data

US 2017/0159229 A1    Jun. 8, 2017

(30) Foreign Application Priority Data

Dec. 8, 2015    (KR) .................. 10-2015-0174041

(51) Int. Cl.
*D06F 39/14*    (2006.01)

(52) U.S. Cl.
CPC .................... *D06F 39/14* (2013.01)

(58) Field of Classification Search
CPC ............................................. D06F 39/14
See application file for complete search history.

(56) References Cited

U.S. PATENT DOCUMENTS

| | | | | |
|---|---|---|---|---|
| 5,437,168 A | * | 8/1995 | Mason ............... | D06F 39/14 68/142 |
| 9,315,934 B2 | * | 4/2016 | Kim .................. | D06F 29/00 |
| 2011/0062837 A1 | * | 3/2011 | Kim .................. | D06F 23/04 312/228 |
| 2012/0119630 A1 | * | 5/2012 | Najera Bernal ...... | D06F 39/14 312/223.1 |
| 2014/0285076 A1 | * | 9/2014 | Woo .................. | D06F 37/28 312/228 |
| 2015/0008808 A1 | * | 1/2015 | Kim .................. | D06F 39/14 312/228 |
| 2015/0252508 A1 | * | 9/2015 | Kim .................. | D06F 29/00 68/27 |
| 2016/0265152 A1 | * | 9/2016 | Park ................. | D06F 39/14 |
| 2016/0273149 A1 | * | 9/2016 | Jo ................... | D06F 37/28 |

FOREIGN PATENT DOCUMENTS

| | | |
|---|---|---|
| EP | 1582618 A1 | 10/2005 |
| EP | 1862579 A1 | 12/2007 |
| EP | 1862579 B1 | 8/2010 |
| JP | 2000167290 A | 6/2000 |
| JP | 2011143040 | 7/2011 |
| JP | 2015204928 A | 11/2015 |
| KR | 10-0854637 | 8/2008 |
| KR | 1020100042984 | 4/2010 |
| KR | 1020150100580 A | 9/2015 |

OTHER PUBLICATIONS

Foreign Communication From a Related Counterpart Application, PCT Application No. PCT/KR2016/014173, International Search Report dated Feb. 2, 2017, 3 pages.

* cited by examiner

*Primary Examiner* — Daniel J Rohrhoff

(57) ABSTRACT

Disclosed herein is a washing machine having an elastic member for providing resilient power to the door in a direction in which the door is opened and a damping member arranged to damp pivoting of the door or an inner door. The washing machine has a structure to smoothly open/shut the door and inner door combined together, and if supplementary washing is required, to smoothly open/shut only the inner door.

20 Claims, 17 Drawing Sheets

WASHING MACHINE

CROSS-REFERENCE TO RELATED APPLICATION(S) AND CLAIM OF PRIORITY

This application claims priority to and the benefit of Korean Patent Application No. 10-2015-0174041, filed on Dec. 8, 2015, the disclosures of which is incorporated herein by reference in its entirety.

TECHNICAL FIELD

The present disclosure relates to a washing machine, and more particularly, to a fully automatic washing machine with dual doors, an outer door and an inner door.

BACKGROUND

A washing machine is a machine used to wash clothes with electric power, and generally includes a fixed tub containing water, a spinning tub installed to be rotated inside the fixed tub, and a pulsator arranged to be rotated on the bottom of the spinning tub. The washing machine typically has a washing space formed by the fixed tub and spinning tub. With this structure, by changing water currents, laundry is washed.

The washing machine may be classified by washing method into agitator type, vortex type, and drum type washers. The agitator type washing machine performs washing by turning a laundry stick rising from the middle of a laundry tub left and right. The vortex type washing machine performs washing by using friction between laundry items and water currents produced by turning the pulsator in the shape of a disc formed on the bottom of the spinning tub left and right. The drum washing machine performs washing by putting water, detergent, and laundry items into a drum from within which multiple lifters protrude and spinning the drum.

Depending on the shape, washing machines may be classified into top-loading washing machines and front-loading washing machines. The top-loading washing machine allows laundry items to be put into the spinning tub through an opening formed on the top of the washing machine. The front-loading washing machine allows laundry items to be put into the spinning tub through an opening formed on the side of the washing machine. In general, the agitator type washing machine and the vortex type washing machine belong to the top-loading washing machine, and the drum washing machine belongs to the front-loading washing machine.

Meanwhile, local stains, for example, hardly come out in washing procedures of those washing machines. The washing machine generally has a washing space formed by the fixed tub and the spinning tub, but has no space for hand washing or extra washing. If the hand washing or extra washing is required, the user has to do the hand washing or extra washing in a separate location and then go back to the washing machine to do laundry. Extra water is also required to do hand washing or extra washing.

In a case where the hand washing or extra washing is available in a washing machine itself, no separate room is required and the water used in the hand or extra washing may be reused in a main washing procedure of the washing machine, thereby saving water.

In the case of top-loading washing machine, the door to open/close an opening formed on the top of the washing machine may be of a dual door type including an outer door and an inner door, and an extra washing space for hand washing may be arranged on the inner door.

SUMMARY

The present disclosure provides a washing machine with an outer door and an inner door, and a structure to smoothly open/shut the outer door and the inner door.

In accordance with an aspect of the present disclosure, there is provide a washing machine including: a cabinet having an opening on the top; an outer door pivotally combined with the cabinet to open/shut the opening; an inner door pivotally combined with the cabinet to open/shut the opening, pivoting around between the outer door and the opening, and detachably combined with the outer door; an elastic member for providing resilient power to the outer door in a direction in which the outer door is opened; and a damping member arranged to damp pivoting of the outer door while the outer door and the inner door is combined.

The damping member may include at least one of a first damping member for damping pivoting of the outer door in a direction of shutting the opening and a second damping member for damping pivoting of the outer door in a direction of opening the opening.

The outer door may include at least one of a first pusher for applying force to the first damping member and a second pusher for applying force to the second damping member. The first pusher may apply force to the first damping member when an extent of opening of the outer door is smaller than a certain angle. The second pusher may apply force to the second damping member when an extent of opening of the outer door is greater than a certain angle.

The cabinet may include a door combiner with which the outer door is pivotally combined. The outer door may be combined with the door combiner by at least one pivot pin unit.

The at least one pivot pin unit may include a body and a pivot pin. The door combiner and the outer door may have pivot holes formed for the pivot pin to pass through.

The elastic member may be formed in a torsion bar. The torsion bar may be arranged inside of the outer door to be located on a pivot shaft line of the outer door.

The outer door may include a supporter arranged to support one bent end of the torsion bar. The other bent end of the torsion bar may be supported against the cabinet.

The pivot pin may have a via hole for the torsion bar to pass through. The other end of the torsion bar supported against the cabinet may pass through the via hole of the pivot pin, and may be supported against the inside of the door combiner of the cabinet.

The via hole of the pivot pin may have the form of an oval hole for the end of the torsion bar to be easily inserted thereto.

The elastic member may be formed in a torsion spring. One end of the torsion spring may be supported against the door and the other end is supported against the cabinet.

The damping member may include a direct-operated oil damper.

In accordance with an aspect of the present disclosure, there is provided a washing machine including: a cabinet having an opening on the top; an outer door pivotally combined with the cabinet to open/shut the opening; an inner door pivotally combined with the cabinet to open/shut the opening, pivoting around between the outer door and the opening, and detachably combined with the outer door; and a damping member arranged to damp pivoting of the inner door while the inner door is pivoting around separately from the outer door.

The outer door and the inner door may pivot around the same pivot axis on the cabinet.

The cabinet may include a door combiner with which the outer door and the inner door are pivotally combined. The outer door and the inner door may be combined with the door combiner by at least one pivot pin unit.

The at least one pivot pin unit may include a body and a pivot pin. The door combiner, the outer door, and the inner door may have pivot holes formed for the pivot pin to pass through.

The inner door may include a supplementary pivot unit arranged to be combined with the door combiner. The outer door may include a hinge into which the door combiner and the supplementary pivot unit are inserted. The pivot holes may be formed in the door combiner, the supplementary pivot unit, and the hinge.

The inner door may include a pusher for applying force to the damping member when an extent of opening of the inner door is smaller than a certain angle.

In accordance with an aspect of the present disclosure, there is provided a washing machine including: a cabinet having an opening on the top; an outer door pivotally combined with the cabinet to open/shut the opening; an inner door pivotally combined with the cabinet to open/shut the opening, pivoting around between the outer door and the opening, and detachably combined with the outer door; and a first damping member for providing damping power for the outer door or the inner door, while the outer door or the inner door is pivoting in a direction of shutting the opening.

The outer door or the inner door may include a first pusher for applying force to the first damping member. The first pusher may apply force to the first damping member when the outer door or the inner door is within a certain angle.

The washing machine may further includes a second damping member for providing damping power for the outer door while the outer door is pivoting in a direction of opening the opening. The outer door may include a second pusher for applying force to a second damping member when an extent of opening of the outer door is greater than a certain angle.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
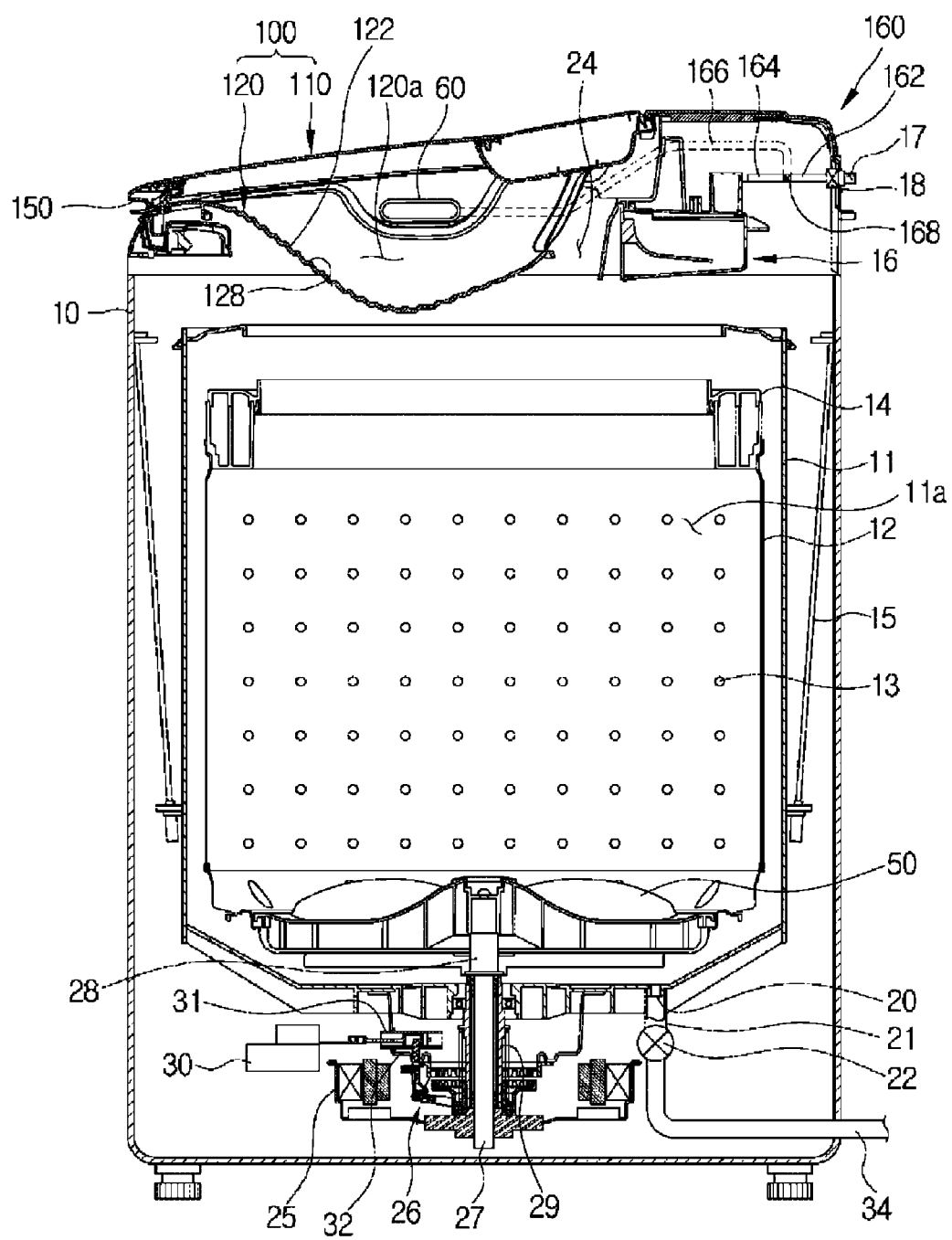
FIG. 1 is a cross-sectional view of a washing machine, according to an embodiment of the present disclosure.

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout.

FIG. 1 is a cross-sectional view of a washing machine, according to an embodiment of the present disclosure.

Referring to FIG. 1, a washing machine 1 may include a cabinet 10 constituting the exterior, a fixed tub 11 placed inside the cabinet 10 to contain water, a spinning tub 12 rotationally placed inside the fixed tub 11, and a pulsator 50 arranged inside the spinning tub 12 to produce water currents.

An opening 24 is formed on the top of the cabinet 10 for allowing the user to put laundry items into the spinning tub 12. The opening 24 may be opened or shut by a door assembly 100 installed on the top of the cabinet 10. The fixed tub 11 may be supported by a suspension system 15 in the cabinet 10.

A water supply tube 17 is installed on the top of the fixed tub 11 to supply water into the fixed tub 11. One end of the water supply tube 17 is connected to an external water supply source and the other end of the water supply tube 17 is connected to a detergent supply unit 16. Water supplied through the water supply tube 17 passes through the detergent supply unit 16 and is supplied into the fixed tub 11 together with the detergent. A water supply valve 18 is installed in the water supply tube 17 to control water supply.

The spinning tub 12 may be shaped like a cylinder with the top open and the sides with a number of dehydration holes formed thereon. A balancer 14 may be equipped on the top of the spinning tub 12 to help the spinning tub 12 stably spin at high speed.

Outside of a lower part of the fixed tub 11, a motor 25 for producing a driving force to spin the spinning tub 12 and the pulsator 50, and an energy converter 26 for delivering the driving force produced by the motor 25 to the spinning tub 12 and the pulsator 50, simultaneously or selectively are installed.

The spinning tub 12 is combined with a dehydration shaft 29 with a cavity, and a washing shaft 27 installed in the cavity of the dehydration shaft 29 may be combined with the pulsator 50 by means of a washing shaft combiner 28. The motor 25 may deliver the driving force to the spinning tub 12 and the pulsator 50, simultaneously or selectively, according to the up/down operation of the energy converter 26.

The energy converter 26 may include an actuator 30 for producing driving force for energy conversion, a rod unit 31 that moves straight according to the operation of the actuator 30, and a clutch unit 32 coupled with the rod unit 31 for pivoting around with the movement of the rod unit 31.

On the bottom of the fixed tub 12, a drain hole 20 is formed to drain the water contained in the fixed tub 12, and the drain hole 20 is connected to a first drain tube 21. A drain valve 22 may be installed in the first drain tube 21 for controlling water drain. An outlet of the drain valve 22 may be connected to a second drain tube 34 for draining water to the outside.

Figure 2:
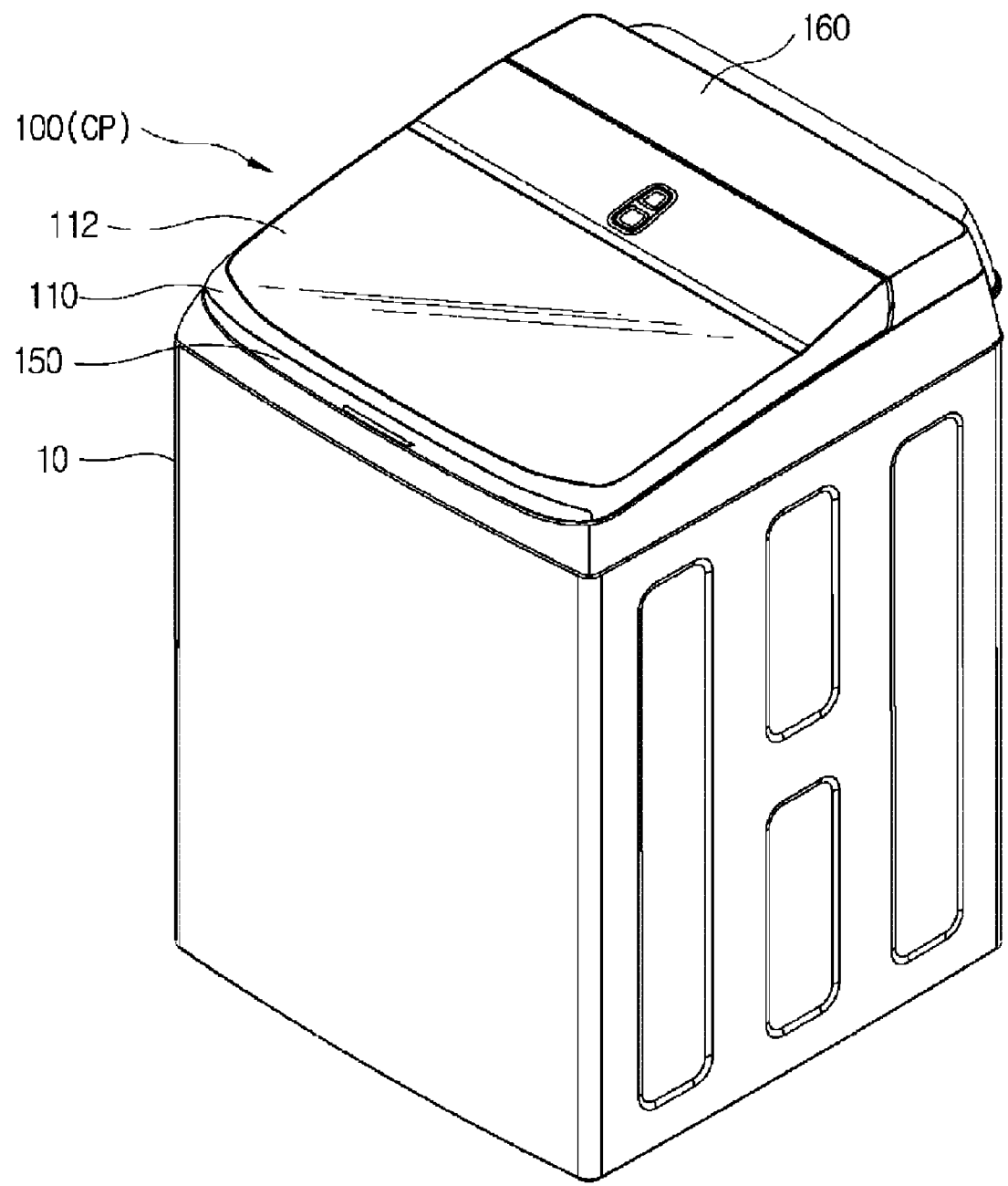
FIG. 2 is a perspective view of a washing machine, according to an embodiment of the present disclosure.
Figure 3:
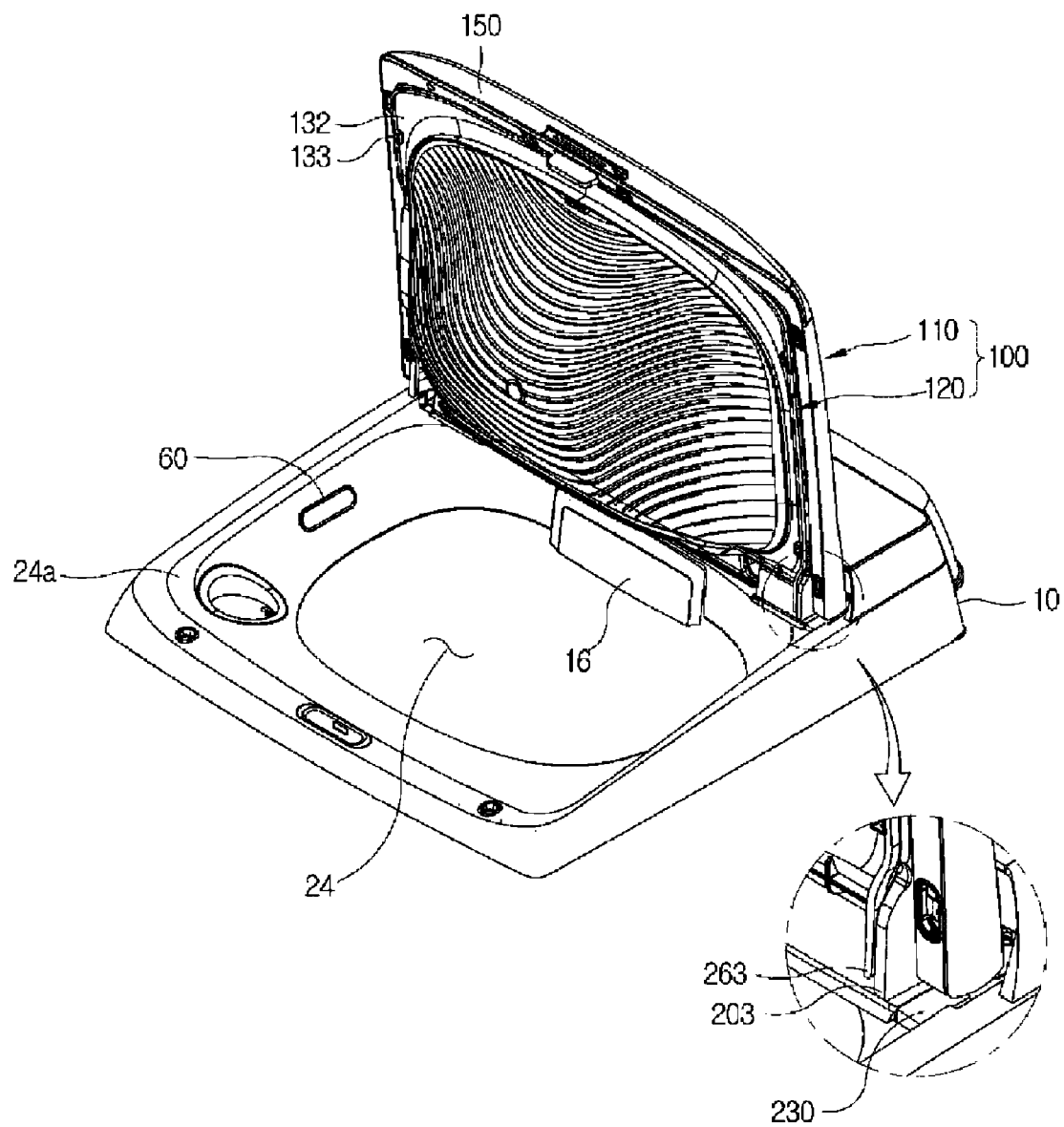
FIG. 3 is a perspective view of an open door assembly of a washing machine, according to an embodiment of the present disclosure.
Figure 4:
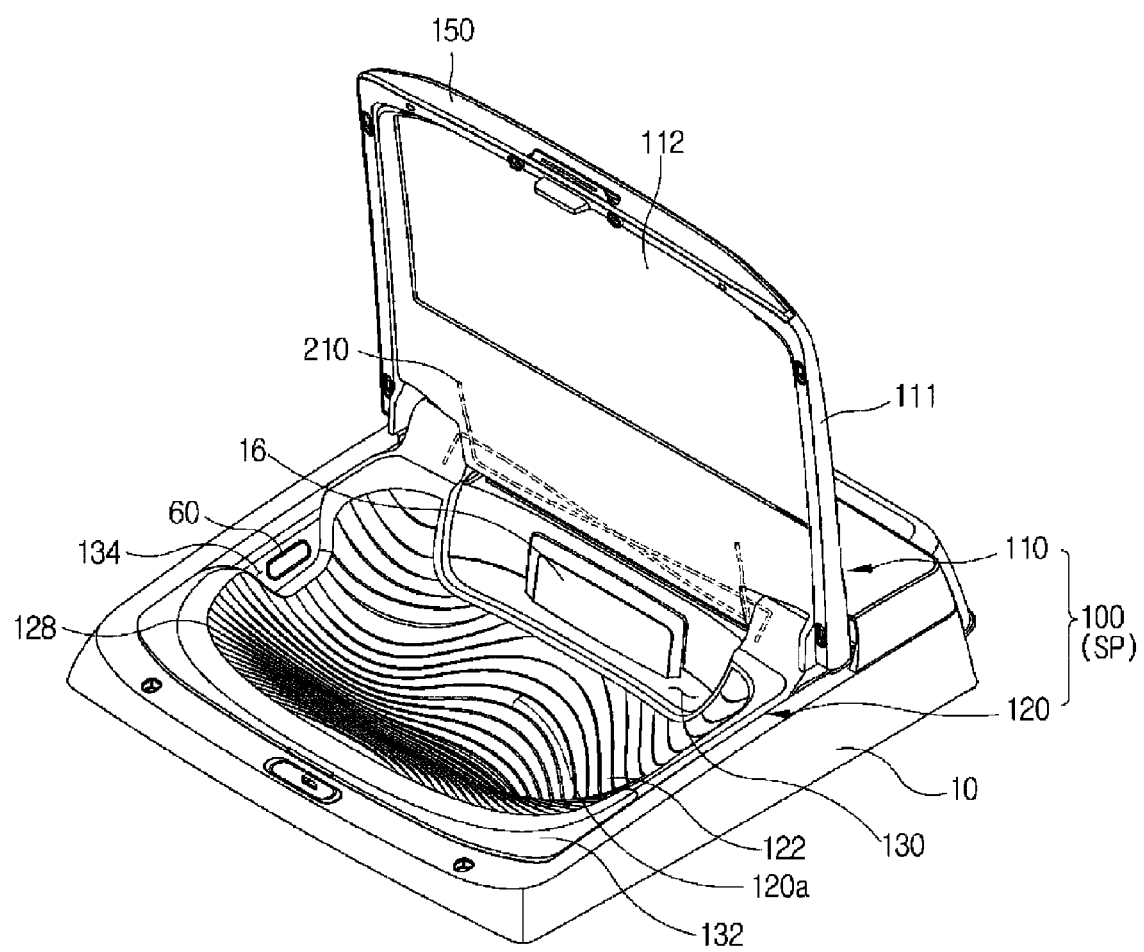
FIG. 4 is a perspective view of an inner door of washing machine settled in place, according to an embodiment of the present disclosure.

FIG. 2 is a perspective view of a washing machine, according to an embodiment of the present disclosure. FIG. 3 is a perspective view of an open door assembly of a washing machine, according to an embodiment of the present disclosure. FIG. 4 is a perspective view of an inner door of washing machine settled in place, according to an embodiment of the present disclosure.

Referring to FIGS. 2 to 4, the door assembly 100 is arranged around the opening 24.

The door assembly 100 may include an outer door 110 and an inner door 120.

The outer door 110 may be arranged on one side of the cabinet to open/shut the opening 24. The outer door 110 may include a transparent member to make the inside visible even while the outer door 110 shuts the opening 24. The transparent member 112 may be arranged in a top frame 111a of a door frame 111.

The inner door 120 may be formed to have a supplementary washing room 120a enabling extra hand washing. The supplementary washing room 120a is separated from a main washing room 11a formed by the fixed tub and spinning tub for the user to be able to do laundry.

The main washing room 11a and the supplementary washing room 120a are separated from each other, each providing an independent washing room. Furthermore, washing in the main washing room 11a and the supplementary washing room 120a may be performed separately or simultaneously.

The inner door 120 may be arranged to be able to pivot around one side under the outer door 110. The inner door 120 may be formed to have the same pivot axis as that of the outer door 110. Pivoting operation of the inner door 120 and the outer door 110 will be described later in detail.

The inner door 120 may include a unit body 122 that forms the supplementary washing room 120a.

The supplementary washing room 120a has the form of almost a concave bowl to receive water and allow extra washing.

The inner door 120 may include frictional projections 128.

The frictional projections 128 are formed on the unit body 122 to facilitate supplementary washing. The frictional projections 128 serve to increase friction with clothes while in hand washing to better remove stains from the clothes, and in an embodiment of the present disclosure, are formed to be more swollen from the inner face of the inner door 120 than neighboring areas. As in the embodiment of the present disclosure, a plurality of frictional projections 128 may be formed to be parallel with one another. However, the shapes and positions of the frictional projections 128 are not limited thereto.

The inner door 120 may include an auxiliary drain 130.

The auxiliary drain 130 may be formed to discharge the used water out of the supplementary washing room 120a. The auxiliary drain 130 may have the form of a hole with an extra opening/shutting member and be located on a side of the unit body 122 of the supplementary washing room 120a. The auxiliary drain 130 may be formed to discharge water contained in the supplementary washing room 120a with inclinations when the inner door 120 is pivoted.

The inner door 120 may include a settling flange 132.

The settling flange 132 may have the form of a flange formed along the edge of the top of the inner door 120, and be settled in the cabinet 10. In other words, the settling flange 132 may be formed in a flange shape along the top of the unit body 122.

In the cabinet 10, a settlement part 24a may be formed along the edge of the opening 24. The settling flange 132 may be formed to sit in the settlement part 24a in the right position. When the settling flange 132 sits in the settlement part 24a in the right position, the inner door 120 may be fixed in the cabinet 10.

A cushion part 133 may be arranged on the bottom of the inner door 120. For example, the cushion part 133 may be arranged on the bottom of the settling flange 132. The cushion part 133 may relieve the impact when the settling flange 132 is settled in the settlement part 24a, and may thus prevent the inner door 120 or the cabinet 10 from breaking or from making noise when the inner door 120 is settled in the cabinet 10.

Referring to FIGS. 1 to 4, the washing machine 1 in accordance with an embodiment of the present disclosure may include a water supply device 160 for supplying water to the main washing room 11a and the supplementary washing room 120a. The water supply device 160 may include a water supply tube 162, a main water supply tube 164, a supplementary water supply tube 166, and a conversion unit 168.

The water supply tube 162 may be connected to the water supply valve 18 at one end, and to the conversion unit 168 at the other end. The water supply tube 162 is formed to deliver the water supplied from the water supply valve 18 to the conversion unit 168.

The main water supply tube 164 may be arranged to supply water to the main washing room 11a. The main water supply tube 164 may be connected to the detergent supply unit 16 at one end and to the conversion unit 168 at the other end.

The supplementary water supply tube 166 may be arranged to supply water to the supplementary washing room 120a of the inner door 120. The supplementary water supply tube 166 may be connected to the supplementary water supply hole 60 at one end, and to the conversion unit 168 at the other end.

The conversion unit 168 may be arranged to selectively supply the water delivered from the water supply tube 162 to one of the main water supply tube 164 and the supplementary water supply tube 166. Specifically, water is supplied into the washing room through at least one of the main water supply tube 164 and the supplementary water supply tube 166 by controlling the conversion unit 168. The conversion unit 168 may include a three-way valve.

In an embodiment of the present disclosure, the main water supply tube 164 and the supplementary water supply tube 166 may be branched from the water supply tube 162 with the conversion unit 168 in between. Alternatively, the main water supply tube 164 and the supplementary water supply tube 166 may be connected to the water supply valve 18 and supplied with water by controlling the water supply valve 18. That is, the main water supply tube 164 connected to the detergent supply unit 16 at one end, and the supplementary water supply tube 166 connected to the supplementary water supply hole 60 at one end may be connected to the water supply valve 18 at their respective other ends.

In an embodiment of the present disclosure, water is selectively supplied to one of the main water supply tube 164 and the supplementary water supply tube 166. However, it is also possible to supply water to the main water supply tube 164 and the supplementary water supply tube 166 at the same time. Furthermore, regardless of whether the opening 24 is opened or shut by the inner door 120, water may be supplied through the supplementary water supply tube 166. If the inner door 120 shuts the opening 24, the water supplied through the supplementary water supply tube 166 may be contained on the inner door 120. Even if the inner door 120 opens the opening 24, the user may enable water to be supplied through the supplementary water supply tube 166 to wash clothes, his/her hands, or the like.

The supplementary water supply hole 60 may be formed to be connected with the supplementary water supply tube 166. The supplementary water supply hole 60 may be formed on one side of the inner door 120 so as to supply water onto the inner door 120.

In order for the water supplied from the supplementary water supply hole 60 to flow onto the inner door 120, a water inlet 134 is formed in the inner door 120 to correspond to the supplementary water supply hole 60. The water inlet 134 may be formed in a part formed to be concave from the top of the unit body 122. The water inlet 134 is, however, not limited to the shape, but may be of any shape that allows water to flow into the supplementary washing room 120a without being interfered by the unit body 122.

The inner door 120 may be formed of a thermoplastic resin. Alternatively, the inner door 120 may be made of an ABS material. However, the inner door 120 is not limited thereto, but may be made of any material that has enough impact resistance and rigidity to do hand washing.

The outer door 110 and the inner door 120 may be referred to as a main door 110 and a hand washing container 120, respectively.

Figure 5:
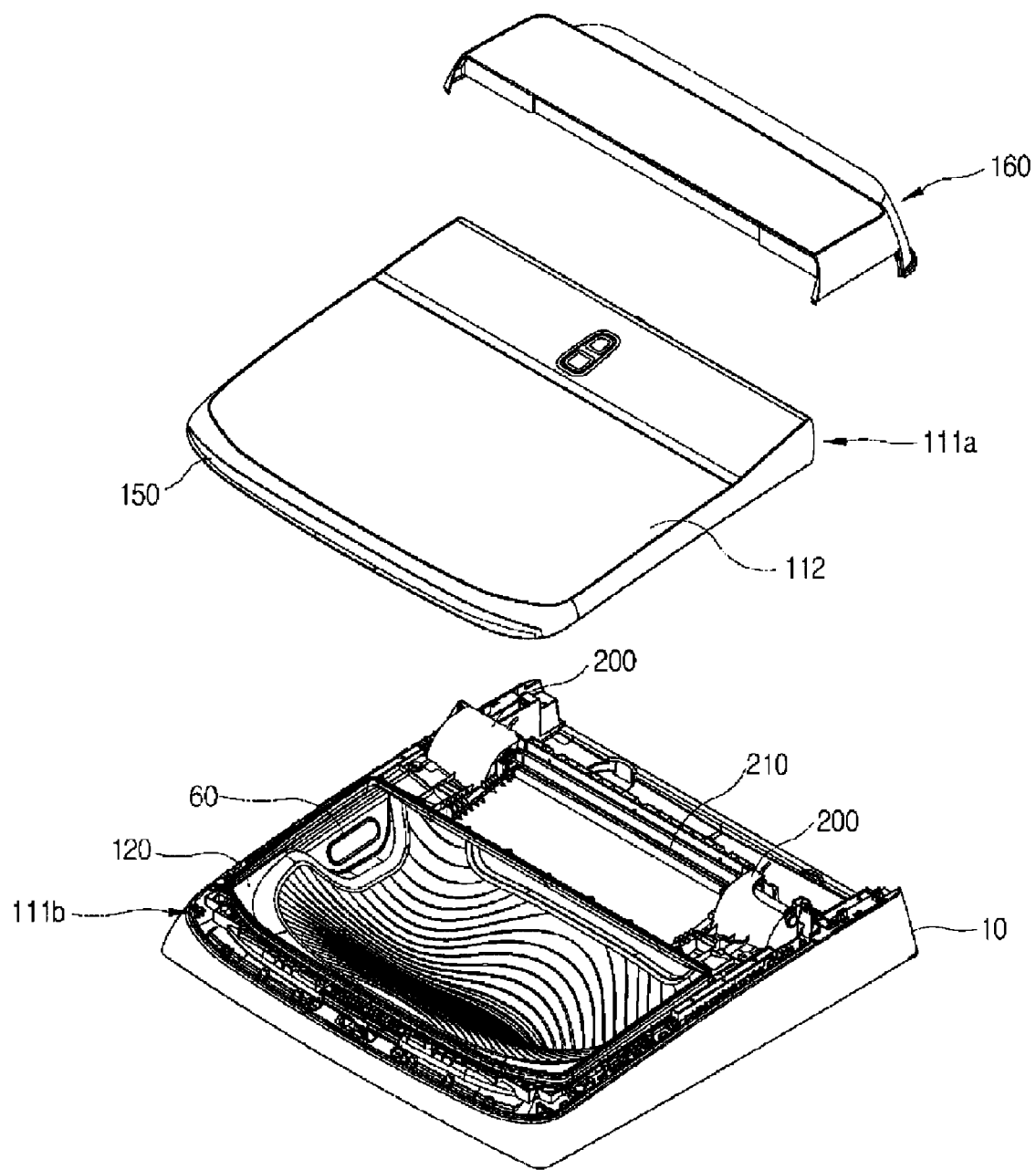
FIG. 5 is an exploded view breaking down into a top frame of an outer door and a water supply part of a cabinet, according to an embodiment of the present disclosure.
Figure 6:
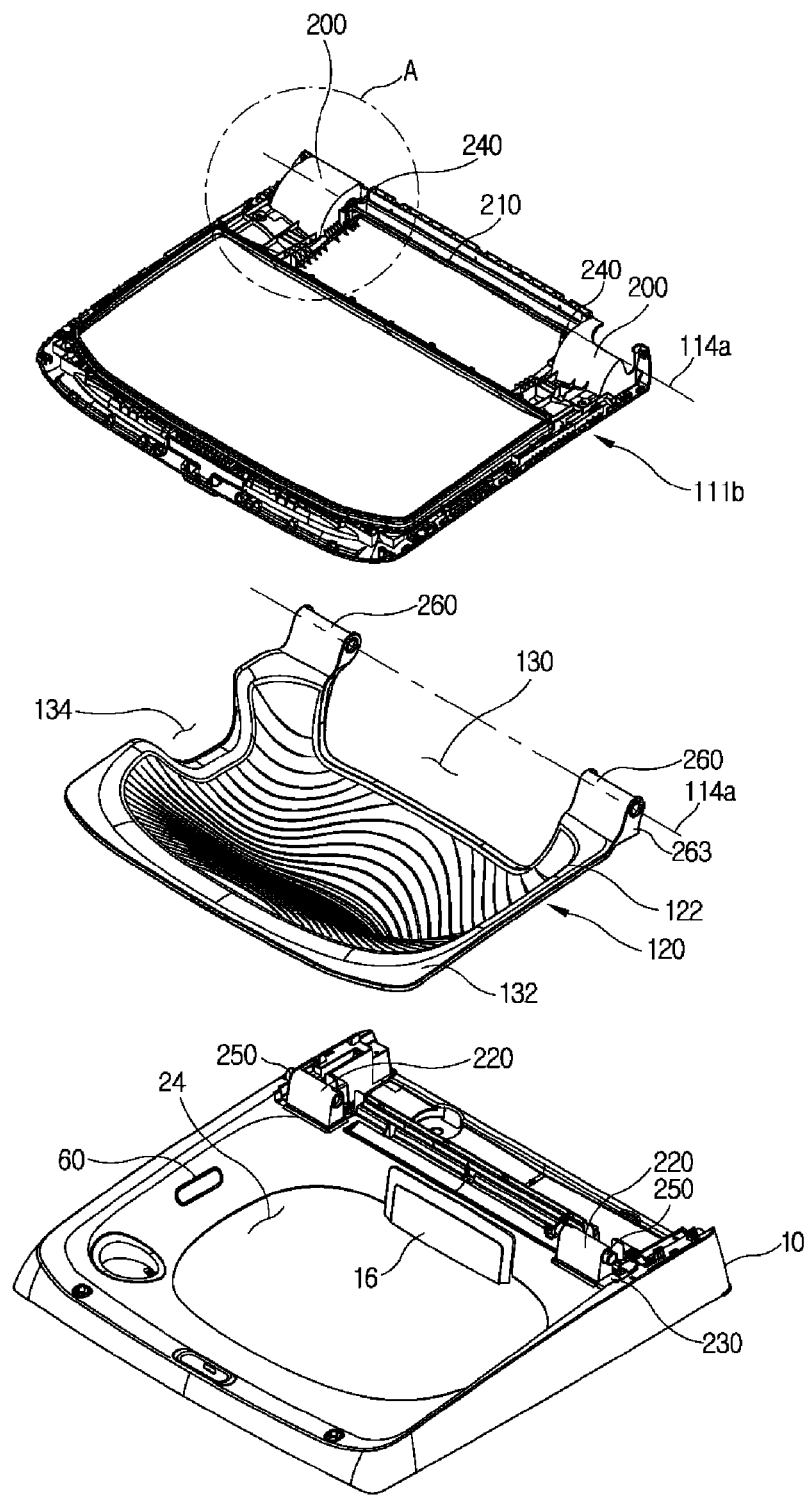
FIG. 6 is an exploded view breaking down into a bottom frame of an outer door, an inner door, and a cabinet, according to an embodiment of the present disclosure.
Figure 7:
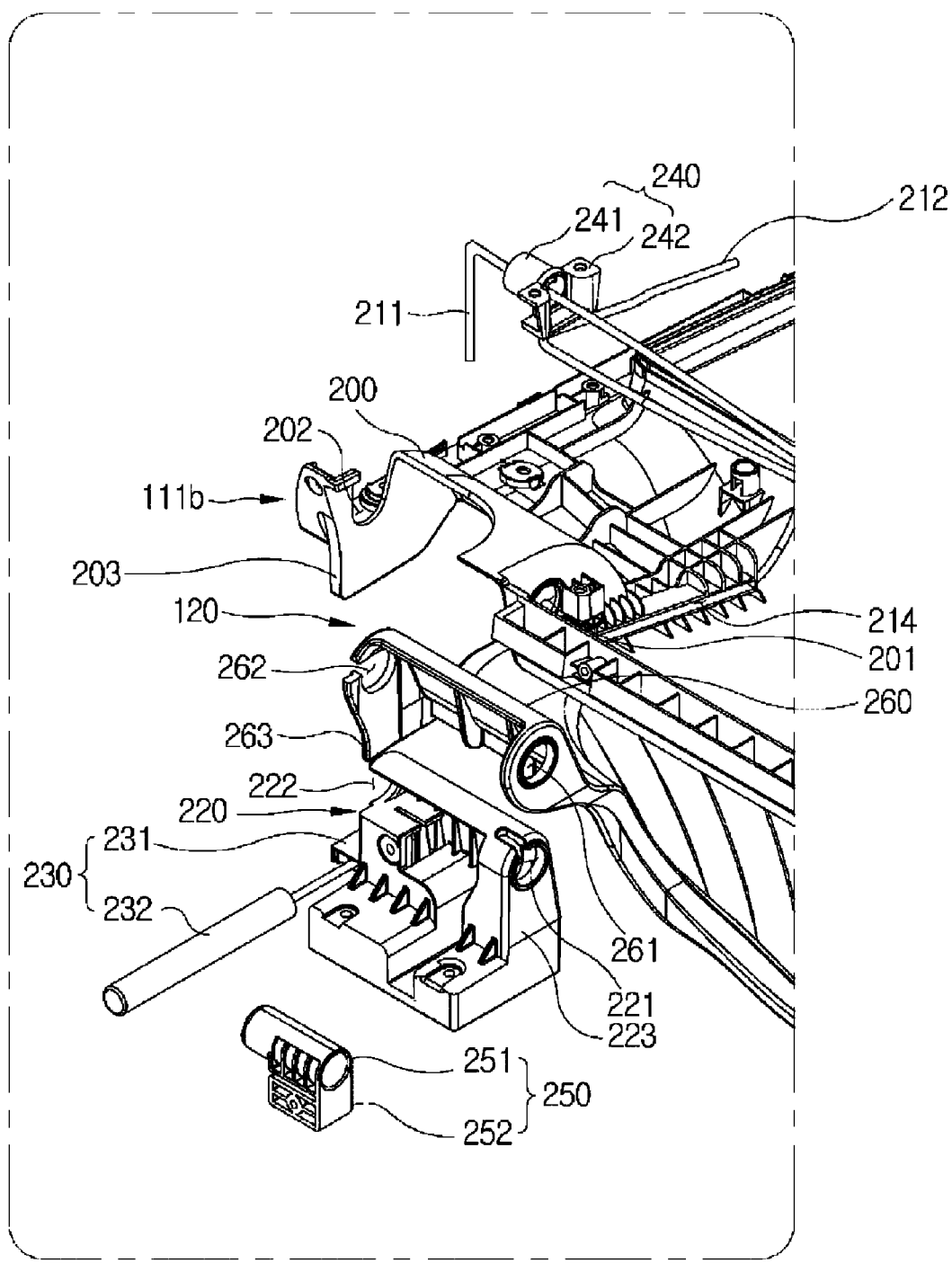
FIG. 7 shows how to combine a bottom frame of an outer door, an inner door, and a door combiner of a cabinet, according to an embodiment of the present disclosure.
Figure 8:
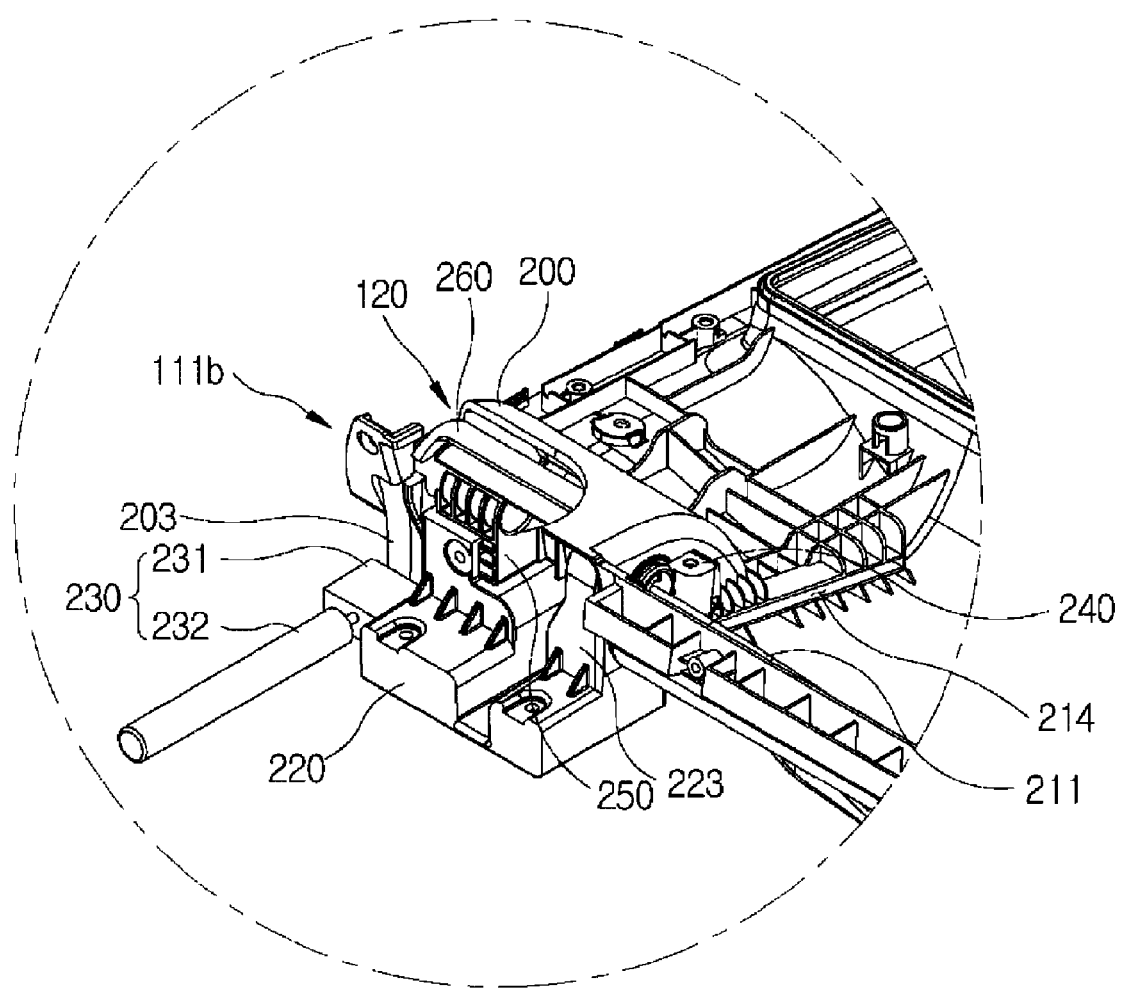
FIG. 8 shows a bottom frame of an outer door, an inner door, and a door combiner of a cabinet, which are combined together, according to an embodiment of the present disclosure.
Figure 9:
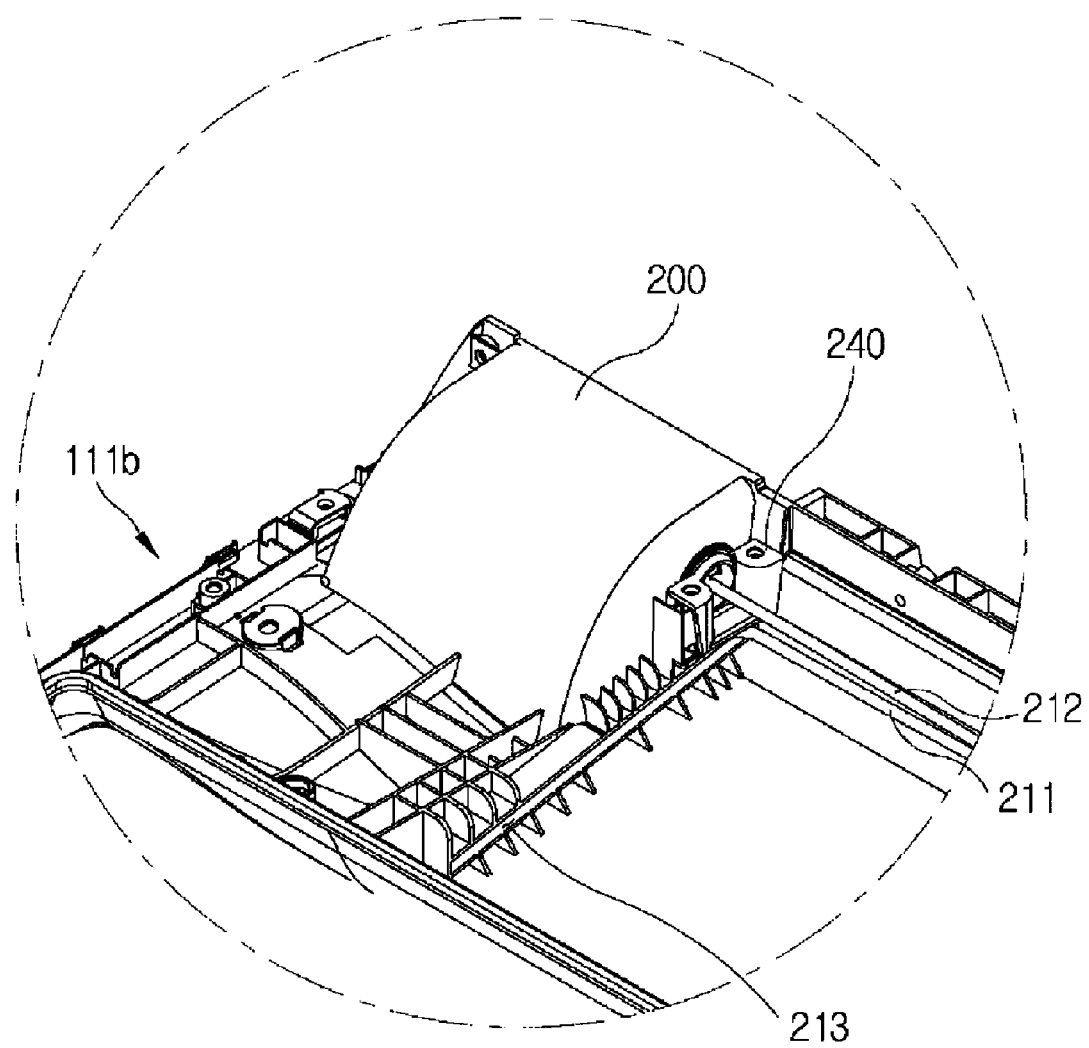
FIG. 9 is an enlarged view of a part of a top frame of an outer door, according to an embodiment of the present disclosure.
Figure 10:
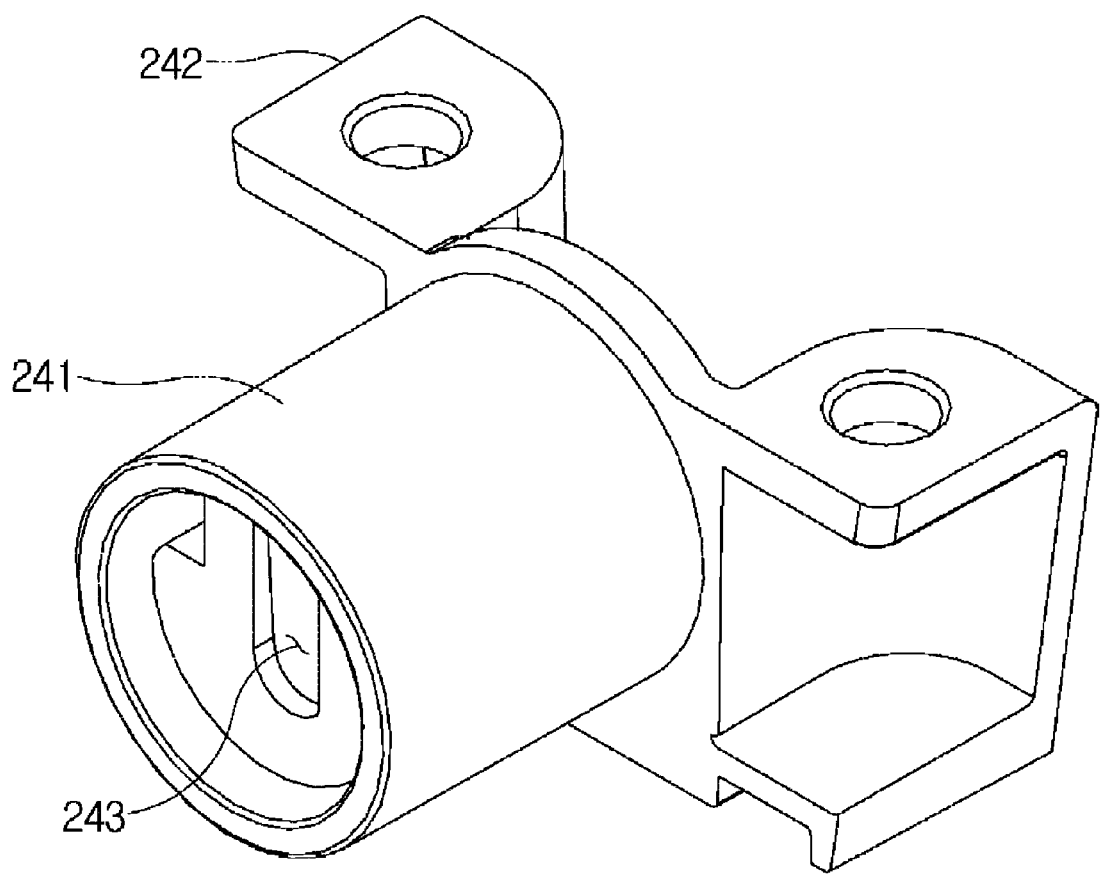
FIG. 10 is a perspective view of a pivot pin unit, according to an embodiment of the present disclosure.

FIG. 5 is an exploded view breaking down into a top frame of an outer door and a water supply part of a cabinet, according to an embodiment of the present disclosure, FIG. 6 is an exploded view breaking down into a bottom frame of an outer door, an inner door, and a cabinet, according to an embodiment of the present disclosure, FIG. 7 shows how to combine a bottom frame of an outer door, an inner door, and a door combiner of a cabinet, according to an embodiment of the present disclosure, FIG. 8 shows a bottom frame of an outer door, an inner door, and a door combiner of a cabinet, which are combined together, according to an embodiment of the present disclosure, FIG. 9 is an enlarged view of part A of the top frame of the outer door shown in FIG. 6, and FIG. 10 is a perspective view of a pivot pin unit, according to an embodiment of the present disclosure. The outer door 110 and the inner door 120 are each mounted to be able to pivot on the cabinet 10.

Referring to FIGS. 5 to 9, the outer door 110 may include the top frame 110a and the bottom frame 110b. The transparent member 112 and the handle unit 160 are mounted in the top frame 110a, and a hinge 200 through which the outer door 110 and the cabinet 10 are pivotally combined, and an elastic member 210 for providing resilient power in the direction in which the outer door 110 is opened may be mounted in the bottom frame 110b.

On the top of the cabinet 10, there may be the water supply unit 160, the door combiner 220, and the damping member 230. The outer door 110 and the inner door 120 may be pivotally combined with the door combiner 220.

The outer door 110 is mounted to be able to pivot around the door pivot shaft 114a, and the inner door 120 is mounted to be able to pivot around a supplementary pivot shaft 140a.

In an embodiment of the present disclosure, the door pivot shaft 114a and the supplementary pivot shaft 140a are arranged on the same side for the outer door 110 and the inner door 120 to be opened/shut in the same direction.

The door pivot shaft 114a and the supplementary pivot shaft 140a may be arranged on the same axis. In other words, the door pivot shaft 114a and the supplementary pivot shaft 140a may be arranged to correspond to each other.

For this, the outer door 110 and the inner door 120 may be pivotally combined with the door combiner 220 through a first pivot pin unit 240 and a second pivot pin unit 250.

The door combiner 220 may be combined onto the top face of the cabinet 10 for the outer door 110 or the inner door 120 to be able to pivot around the door pivot shaft 114a or the supplementary pivot shaft 140a in the cabinet 10. Specifically, the door combiner 220 may be inserted into a hinge 200 mounted on the outer door 110. First pivot holes 221, 201 and second pivot holes 222, 202 through which the first pivot pin unit 240 and the second pivot pin unit 250 passes, respectively, may be formed in the door combiner 220 and the hinge 200, and the outer door 110 may be pivotally supported by the first and second pivot pin units 240 and 250 against the cabinet 10.

Furthermore, even in a supplementary pivot unit 260 of the inner door 120, the first and second pivot holes 261 and 262 may be formed for the first and second pivot pin units 240 and 250 to pass through. The supplementary pivot unit 260 may be pivotally arranged by being inserted into the hinge 200 of the outer door 110 such that the door pivot shaft 114a and the supplementary pivot shaft 140a correspond to each other.

The first pivot pin unit 240 may include a first body 242, and a first pivot pin 241 extending from one side of the first body 242. The first pivot pin 241 may be inserted into the first pivot holes 201, 221, 261, and the first body 242 may be fixed inside the bottom door frame 111b.

The second pivot pin unit 250 may include a second pivot pin 251, and a second body 252 that supports the second pivot pin 251 and is fixed to the door combiner 220.

In order for the outer door 110 and the inner door 120 to be combined with the door combiner 220 of the cabinet 10, the first pivot pin 241 may be inserted from outside of the door hinge 200 to pass through the first pivot holes 201, 221, 261. The second pivot pin 251 may be inserted from inside of the door combiner 220 to pass through the second pivot holes 202, 222, 262.

When the first pivot pin 241 is inserted, the first body 242 may be fixed on the bottom door frame 111b, and when the second pivot pin 251 is inserted, the second body 252 may be fixed to the door combiner 220. Accordingly, the outer door 110 and the inner door 120 may be pivotally combined with the cabinet 10.

Forms and positions in which the outer door 110 and the inner door 120 are pivoted are not limited, and may be whatever enables the outer door 110 and the inner door 120 to pivot around the same axis to open/shut the opening 24.

The supplementary pivot unit 260 may be formed to protrude from the unit body 122 such that the supplementary pivot shaft 140a is separated from the unit body 122. These features may increase a pivoting radius of the inner door 120 and prevent the unit body 122 from being interfered by the outer door 110 or the cabinet 10 while the inner door 120 is pivoted.

An elastic member 210 and a damping member 230 of a washing machine in accordance with an embodiment of the present disclosure will now be described.

In conventional washing machines, a device to open/shut the door of the washing machine has many different types of parts and has a complicated structure, requiring many assembling processes. Moreover, the conventional hinge structure provides a function for the door to be automatically shut when the extent of opening of the door is less than a threshold angle and automatically opened when the extent of opening of the door is greater than the threshold angle. This hinge structure causes poor emotional quality in shutting the door, and is inefficient if a damping member is added because expenses and assembling processes increase. Furthermore, the door may not be smoothly shut when the extent of opening of the door is small, even if the damping member is added.

Meanwhile, the washing machine 1 according to the present disclosure may include an elastic member 210 that provides resilient power in a direction in which the outer door 110 is opened. The elastic member 210 may serve to reduce weights of the outer door 110 or the door assembly 100 to prevent them from falling free under their weights in shutting the outer door 110 or the door assembly 100. The elastic member 210 may also provide resilience for the outer door 110 or the door assembly 100 to be easily opened in opening the outer door 110 or the door assembly 100.

The washing machine 1 according to an embodiment of the present disclosure may include the damping member 230 for the door assembly 100 to be smoothly settled in the cabinet 10. The damping member 230 may damp pivoting of the door assembly 100 when the extent of opening of the door assembly 100 is smaller than a certain angle. Accordingly, in the shutting operation of the door assembly 100, the door assembly 100 may pivot to an angle while being forced by the elastic member 210, and may be smoothly shut until being completely settled in the cabinet 10 due to the damping member 230 working after the door assembly 100 reaches an operation angle of the damping member 230.

The damping member 230 may damp not only the pivoting of the door assembly 100, but also pivoting of the inner door 120 when the extent of opening of the inner door 120 is smaller than a certain angle even in an occasion to separate the inner door 120 from the door assembly 100 and settle the inner door 120 in the cabinet 10, i.e., in an occasion when the opening 24 is shut by pivoting the inner door 120 separately from the outer door 110. Since the inner door 120 is generally lighter than the outer door 110, it may pivot in the similar way as the door assembly 100 is shut with the damping member 230, even if the inner door 120 is falling under its weight without resilience of the elastic member. Specifically, in the operation of settling the inner door 120 in the cabinet 10, the inner door 120 may pivot to an angle, and may smoothly fall until being completely settled in the cabinet 10 due to the damping member 230 working after the inner door 120 reaches an operation angle of the damping member 230. Furthermore, the damping member 230 may allow the opening 24 to be easily opened by providing repulsive force in the case of raising the inner door 120.

Referring to FIGS. 5 to 10, the elastic member 210 may be arranged inside the outer door 110. For the elastic member 210, a torsion bar 210 or a torsion spring (not shown) may be used.

In a case where the torsion spring is used for the elastic member, an end of the torsion spring is supported by the outer door 110 and the other end is supported by the cabinet 10, so the torsion spring may provide repulsive force against pivoting.

In a case where the torsion bar 210 is used for the elastic member, the torsion bar 210 may be arranged inside the door frame 111 to be located on the pivot shaft lines 114a, 140a of the outer door 110 and the inner door 120. The torsion bar 210 may include a first torsion bar 211 and a second torsion bar 212 arranged to cross each other. Both ends of the torsion bar 210 are bent such that one end may be supported against the inside of the outer door 110 and the other end may be supported against the cabinet 10.

In the bottom door frame 111b, a first supporter 213 and a second supporter 214 to support one ends of the first and second torsion bars 211 and 212, respectively, may be arranged.

The other end of the torsion bar 210 supported against the cabinet 10 may be supported on the inside of the door combiner 220 of the cabinet 10 not to expose the torsion bar 210. Specifically, the other end of the torsion bar 210 may pass through a via hole 243 formed in the first pivot pin 241 of the first pivot pin unit 240 and be contained and supported in a torsion bar container 223 of the door combiner 220. The via hole 243 formed in the first pivot pin 241 of the first pivot pin unit 240 may have an oblong shape that elongates in one direction so as to easily receive the end of the torsion bar 210. Moreover, an incision is made in an upper part of the first pivot hole 221 of the door combiner 220 to help the torsion bar 210 pass through the first pivot hole 221.

The damping member 230 may be arranged in the door frame 111 to be adjacent to the door combiner 220. A direct-operated oil damper including a piston 231 and a cylinder 232 may be used for the damping member 230. First and second pushers 203 and 263 may be arranged respectively on the outer door 110 and the inner door 120 to apply force to the damping member 230.

Operation of the door assembly of the washing machine with the aforementioned structure will now be described.

Figure 11A:
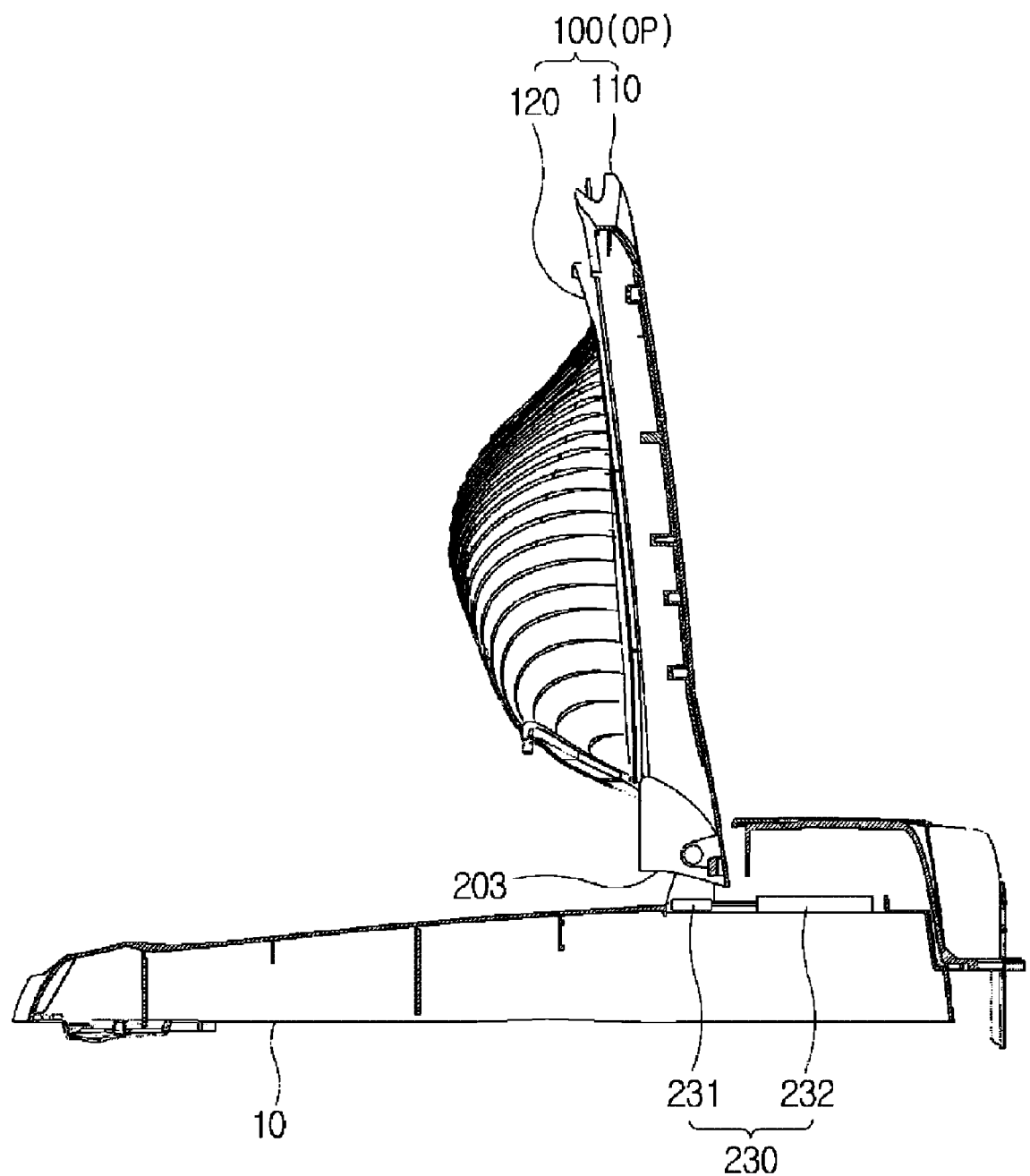
FIGS. 11A, 11B, and 11C show closing operation of a door assembly, according to an embodiment of the present disclosure.
Figure 11B:
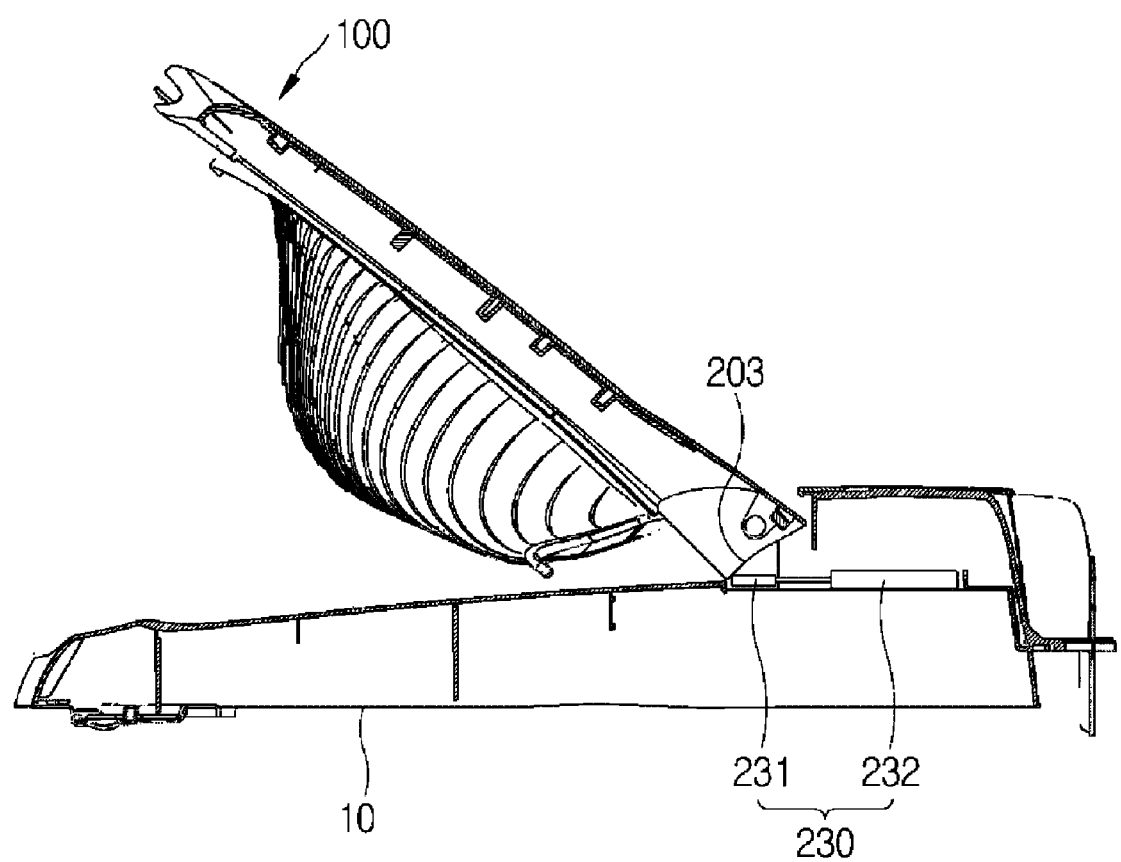
Figure 11C:
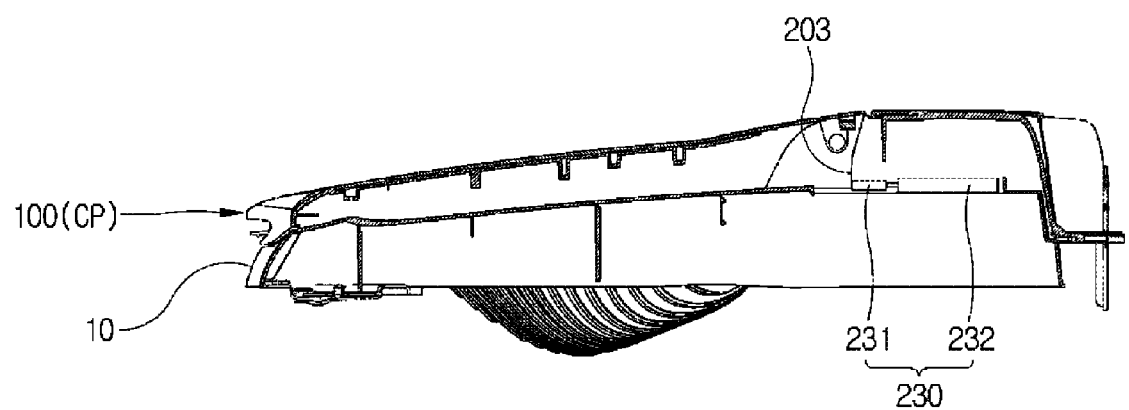
Figure 12A:
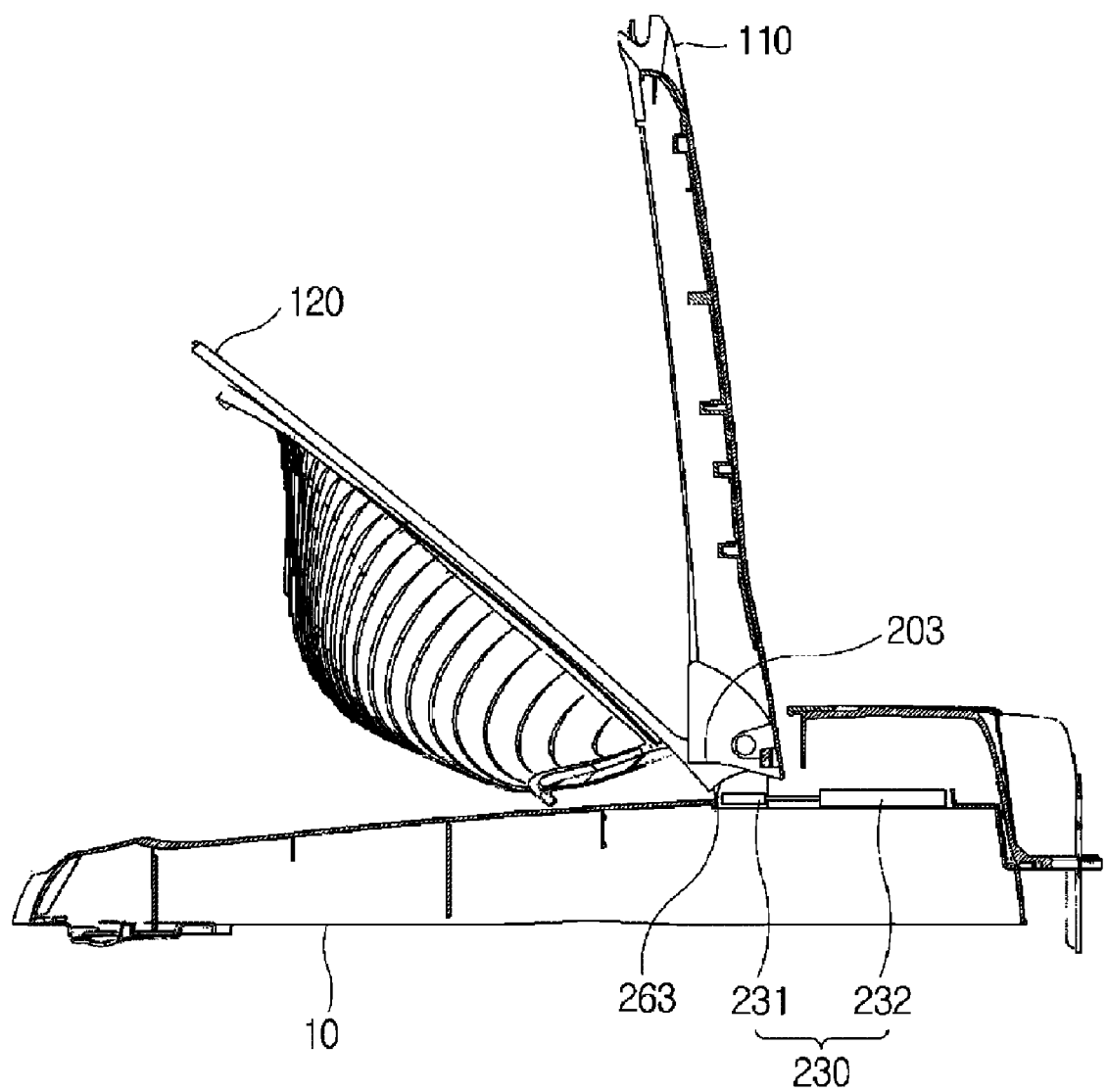
FIGS. 12A and 12B show settling operation of an inner door, according to an embodiment of the present disclosure.
Figure 12B:
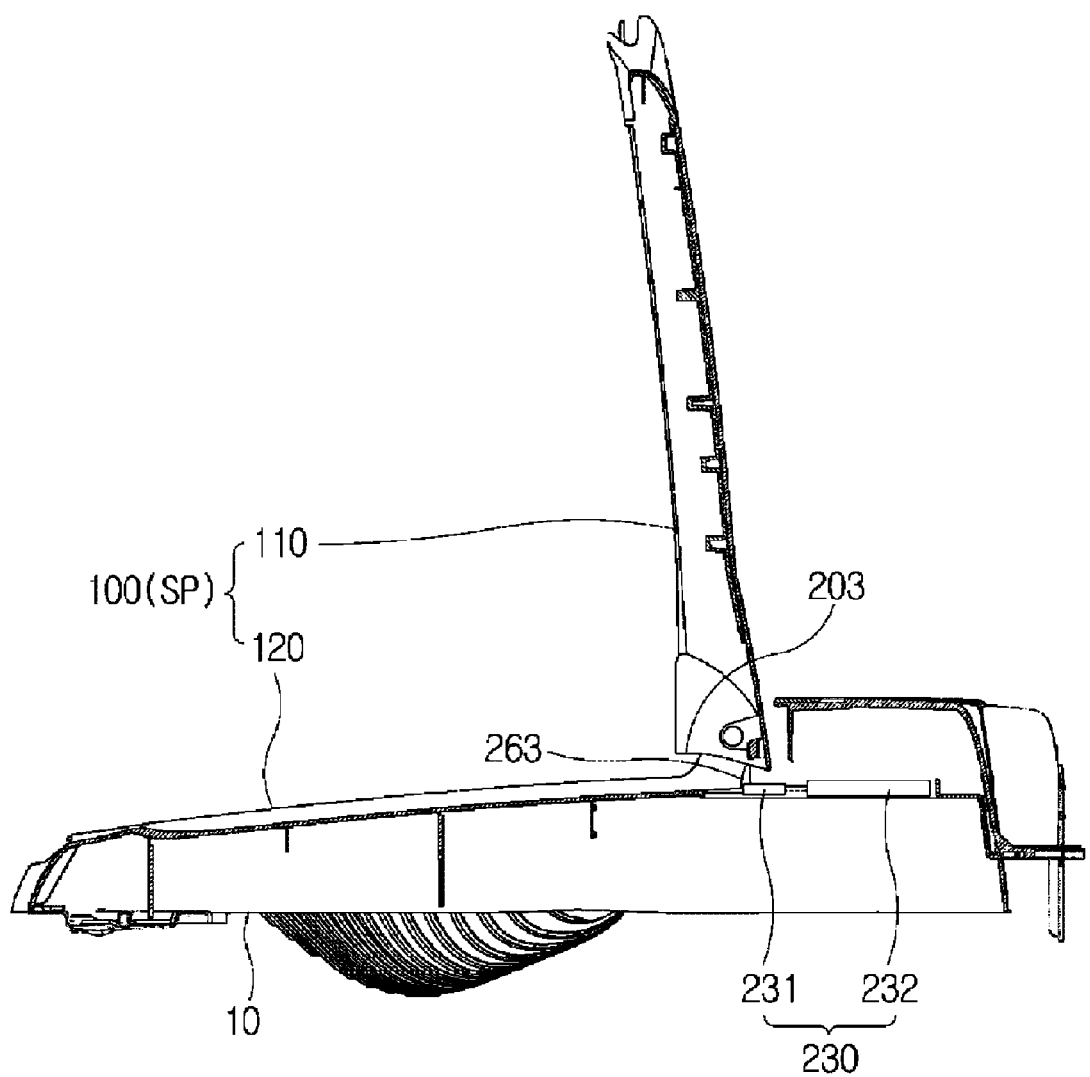

FIGS. 11A, 11B, and 11C show closing operation of a door assembly, according to an embodiment of the present disclosure, and FIGS. 12A and 12B show settling operation of an inner door, according to an embodiment of the present disclosure. Referring to FIGS. 2 to 4, and 11A to 12B, the door assembly 100 in accordance with an embodiment of the present disclosure may be located in closing position CP, in supplementary washing position SP, or in open position OP by the outer door 110 or the inner door 120 pivoting around the pivot shafts 114a, 140a.

The closing position CP is a position in which the door assembly 100 shuts the opening 24 with the outer door 110 and the inner door 120 located on the opening 24. When the door assembly 100 is in the closing position CP, washing operation of the washing machine 1 may be performed.

The supplementary washing position SP is a position in which the outer door 110 is opened by pivoting around the door pivot shaft 114a from the closing position CP of the door assembly 100 while the inner door 120 shuts the opening 24. While the door assembly 100 is in the supplementary washing position SP, the user may do supplementary washing on the inner door 120.

The open position OP is a position in which the door assembly 100 opens the opening 24 by pivoting around the pivot shafts 114a, 140a. The outer door 110 or the inner door 120 may open the opening 24 by pivoting around the pivot shafts 114a, 140a from the closing position CP or from the supplementary washing position SP. While the door assembly 100 is in the open position OP, the user may put clothes into the main washing room 11a through the opening 24.

The door assembly 100 may be shifted among the closing position CP, the supplementary washing position SP, and the open position OP by the user's manipulation of a handle 150.

Referring to FIGS. 11A to 11C, while the door assembly 100 having the outer door 110 and the inner door 120 combined together is pivoting around, the first pusher 203 arranged on the outer door 110 may press the piston 231 of the damping member 230. Furthermore, although not shown, the second pusher 263 arranged on the inner door may also press the piston 231 of the damping member 230 while the door assembly 100 is pivoting around. The door assembly 100 may fall to some angle from the open position OP with its own weight reduced by resilience of the elastic member 210. When reaching an angle corresponding to the operation angle of the damping member 230, the door assembly 100 starts to be smoothly pivoted by the damping member 230 to the closing position CP and shuts the opening 24.

Referring to FIGS. 12A and 12B, while the door assembly 100 having the outer door 110 and the inner door 120 separated from each other is pivoting around, the second pusher 263 arranged on the inner door 120 may press the piston 231 of the damping member 230. The inner door 120 may fall to some angle from the open position OP under its own weight, and when reaching the operation angle of the damping member 230, smoothly pivot up to the supplementary washing position SP and be settled in the cabinet 10.

Figure 13A:
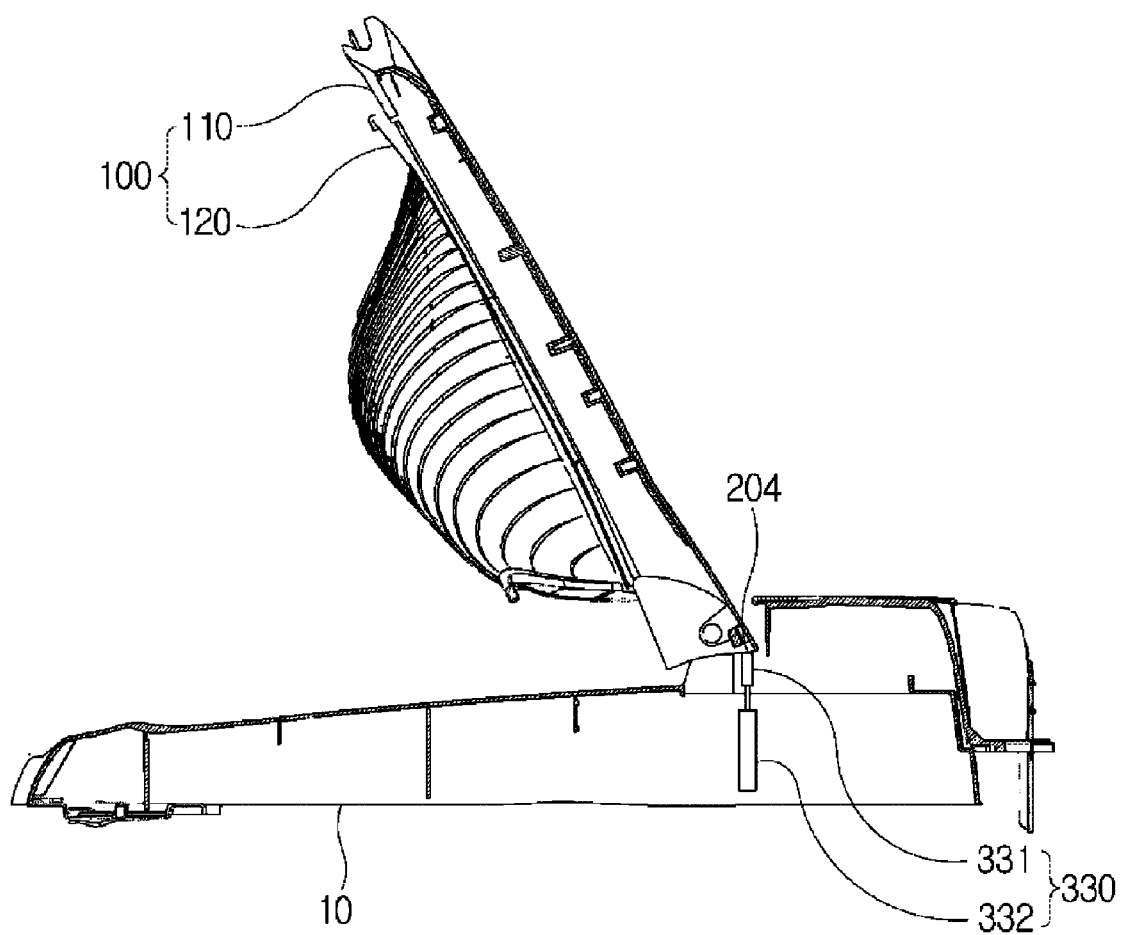
FIGS. 13A and 13B show opening operation of a door assembly, according to an embodiment of the present disclosure.
Figure 13B:
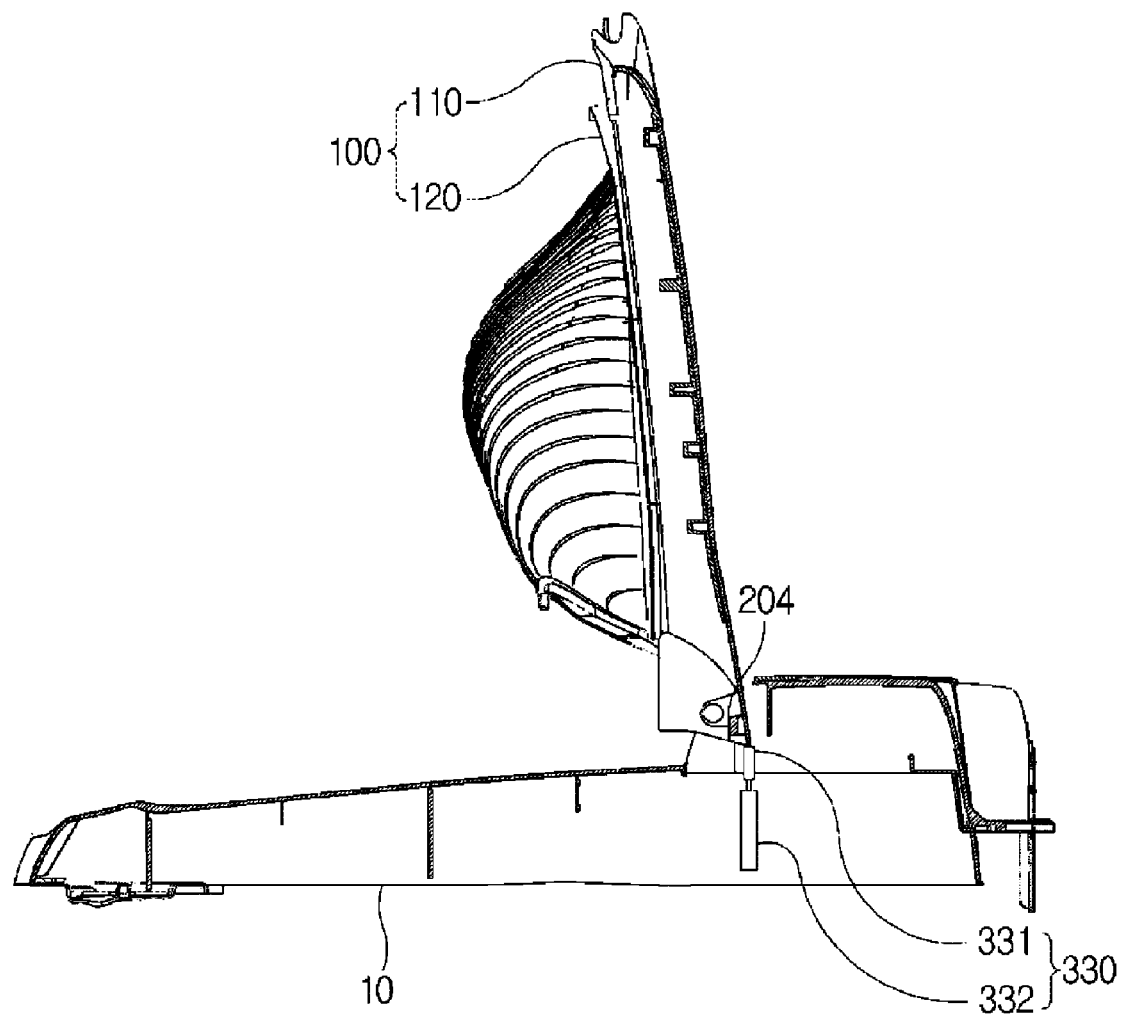

FIGS. 13A and 13B show opening operation of a door assembly, according to an embodiment of the present disclosure.

In opening the door assembly 100 having the outer door 110 and the inner door 120 combined together from the closing position CP, the door assembly 100 could be roughly opened due to its own weight and the resilience of the elastic member 210, which may degrade the emotional quality in using the washing machine.

Referring to FIGS. 13A and 13B, the washing machine 1 in accordance with an embodiment of the present disclosure may include another damping member 330 arranged to smoothly open the door assembly 100 in opening the door assembly 100. The damping member 330 may have the form of a direct-operated oil damper including the piston 331 and the cylinder 332. A third pusher 204 may be arranged on the outer door 110 to press the damping member 330.

In opening the door assembly 100, when the door assembly 100 is opened to a certain angle under its own weight, the damping member 330 works to enable the door assembly 100 to be smoothly opened to the open position OP.

A washing machine in accordance with an embodiment of the present disclosure may include both the damping member 230 as shown in FIGS. 11A to 12B and the damping member 330 as shown in FIGS. 13A and 13B, and the outer door 110 may include both pushers 203, 304 to apply force to the first and second damping members 230 and 330.

The door open/shut structure including the elastic member and the damping member in accordance with embodiments of the present disclosure may be applied for various types of doors of household appliances, such as mini bars of refrigerators, bidets, top-loading kimchi fridges, etc.

According to embodiments of the present disclosure, outer door and inner door may be smoothly opened/shut in the washing machine.

The outer door and the inner door may be combined and smoothly opened/shut together, and if supplementary washing is required, only the indoor may be smoothly opened/shut.

The scope of the present disclosure is not limited to the aforementioned embodiments. It will be understood by those skilled in the art that various changes in form and details may be made therein without departing from the spirit and scope of the disclosure as defined by the appended claims and their equivalents.

What is claimed is:

1. A washing machine comprising:
   a cabinet having an opening on top;
   an outer door pivotally combined with the cabinet to open/shut the opening;
   an inner door pivotally combined with the cabinet to open/shut the opening, pivoting around between the outer door and the opening, and detachably combined with the outer door;
   an elastic member for providing resilient power to the outer door in a direction in which the outer door is opened; and
   a damping member arranged to damp pivoting of the outer door while the outer door and the inner door is combined.

2. The washing machine of claim 1, wherein the damping member comprises at least one of a first damping member for damping pivoting of the outer door in a direction of shutting the opening and a second damping member for damping pivoting of the outer door in a direction of opening the opening.

3. The washing machine of claim 2, wherein the outer door comprises at least one of a first pusher for applying force to the first damping member and a second pusher for applying force to the second damping member,
   wherein the first pusher applies force to the first damping member when an extent of opening of the outer door is smaller than a certain angle, and wherein the second pusher applies force to the second damping member when an extent of opening of the outer door is greater than a certain angle.

4. The washing machine of claim 1, wherein the cabinet comprises a door combiner with which the outer door is pivotally combined, and
wherein the outer door is combined with the door combiner by at least one pivot pin unit.

5. The washing machine of claim 4, wherein the at least one pivot pin unit comprises a body and a pivot pin, and
wherein the door combiner and the outer door have pivot holes formed for the pivot pin to pass through.

6. The washing machine of claim 4, wherein the elastic member is formed in a torsion bar, and
wherein the torsion bar is arranged inside of the outer door to be located on a pivot shaft line of the outer door.

7. The washing machine of claim 6, wherein the outer door comprises a supporter arranged to support one bent end of the torsion bar, and
wherein the other bent end of the torsion bar is supported against the cabinet.

8. The washing machine of claim 7, wherein a pivot pin has a via hole for the torsion bar to pass through, and
wherein the other end of the torsion bar supported against the cabinet passes through the via hole of the pivot pin, and is supported against the inside of the door combiner of the cabinet.

9. The washing machine of claim 8, wherein the via hole of the pivot pin has a form of an oval hole for the end of the torsion bar to be easily inserted thereto.

10. The washing machine of claim 1, wherein the elastic member is formed in a torsion spring, and
wherein one end of the torsion spring is supported against a door and the other end is supported against the cabinet.

11. The washing machine of claim 1, wherein the damping member comprises a direct-operated oil damper.

12. A washing machine comprising:
a cabinet having an opening on top;
an outer door pivotally combined with the cabinet to open/shut the opening;
an inner door pivotally combined with the cabinet to open/shut the opening, pivoting around between the outer door and the opening, and detachably combined with the outer door; and
a damping member arranged to damp pivoting of the inner door while the inner door is pivoting around separately from the outer door.

13. The washing machine of claim 12, wherein the outer door and the inner door pivot around a same pivot axis on the cabinet.

14. The washing machine of claim 13, wherein the cabinet comprises a door combiner with which the outer door and the inner door are pivotally combined, and
wherein the outer door and the inner door are combined with the door combiner by at least one pivot pin unit.

15. The washing machine of claim 14, wherein the at least one pivot pin unit comprises a body and a pivot pin, and
wherein the door combiner, the outer door, and the inner door have pivot holes formed for the pivot pin to pass through.

16. The washing machine of claim 14, wherein the inner door comprises a supplementary pivot unit arranged to be combined with the door combiner,
wherein the outer door comprises a hinge into which the door combiner and the supplementary pivot unit are inserted, and
wherein pivot holes are formed in the door combiner, the supplementary pivot unit, and the hinge.

17. The washing machine of claim 12, wherein the inner door comprises a pusher for applying force to the damping member when an extent of opening of the inner door is smaller than a certain angle.

18. A washing machine comprising:
a cabinet having an opening on top;
an outer door pivotally combined with the cabinet to open/shut the opening;
an inner door pivotally combined with the cabinet to open/shut the opening, pivoting around between the outer door and the opening, and detachably combined with the outer door; and
a first damping member for providing damping power for the outer door or the inner door, while the outer door or the inner door is pivoting in a direction of shutting the opening.

19. The washing machine of claim 18, wherein the outer door or the inner door comprises a first pusher for applying force to the first damping member, and
wherein the first pusher applies force to the first damping member when the outer door or the inner door is within a certain angle.

20. The washing machine of claim 18, further comprising:
a second damping member for providing damping power for the outer door while the outer door is pivoting in a direction of opening the opening,
wherein the outer door comprises a second pusher for applying force to a second damping member when an extent of opening of the outer door is greater than a certain angle.

* * * * *